(12) United States Patent  
Sinclair, II et al.

(10) Patent No.: US 8,542,253 B2  
(45) Date of Patent: *Sep. 24, 2013

(54) MAGNIFICATION ENGINE

(75) Inventors: Robert E. Sinclair, II, Sammamish, WA (US); Brendan McKeon, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/541,798

(22) Filed: Jul. 5, 2012

(65) Prior Publication Data

US 2012/0268496 A1 Oct. 25, 2012

Related U.S. Application Data

(60) Continuation of application No. 12/861,062, filed on Aug. 23, 2010, now Pat. No. 8,217,965, which is a continuation of application No. 11/724,123, filed on Mar. 14, 2007, now Pat. No. 7,800,636, which is a division of application No. 10/253,680, filed on Sep. 24, 2002, now Pat. No. 7,194,697.

(51) Int. Cl.
*G09G 5/00* (2006.01)
*G06F 15/00* (2006.01)
*G06T 1/00* (2006.01)

(52) U.S. Cl.
USPC .......................................... 345/660; 345/501

(58) Field of Classification Search
USPC .................................. 345/660, 501, 520, 629
See application file for complete search history.

(56) References Cited

U.S. PATENT DOCUMENTS

| | | | |
|---|---|---|---|
| 5,426,723 | A | 6/1995 | Horsley |
| 5,684,969 | A | 11/1997 | Ishida |
| 5,751,283 | A | 5/1998 | Smith |
| 5,963,216 | A | 10/1999 | Chiarabini et al. |
| 6,288,702 | B1 | 9/2001 | Tachibana et al. |
| 6,590,583 | B2 | 7/2003 | Soohoo |
| 6,714,218 | B1 | 3/2004 | Bian |
| 6,741,270 | B1 | 5/2004 | Rzepkowski et al. |
| 6,750,888 | B1 | 6/2004 | Nakagawa |

(Continued)

OTHER PUBLICATIONS

Dusling, Kevin, et al., "Choosing a Screen Magnifier", Product Evaluation, Access World®, Nov. 2001, vol. 2, No. 6, retrieved from http://www.afb.org/afbpress/pub.asp?DocID=aw020603 on Jul. 8, 2004 (8 pages).

(Continued)

*Primary Examiner* — Jacinta M Crawford
(74) *Attorney, Agent, or Firm* — Merchant & Gould

(57) ABSTRACT

An improved graphics processing system and method are described for magnifying visual output information for printing, display, or other output. A graphics engine transforms display information so as to magnify one or more components or areas of an output image for display via output hardware such as a screen or printer. Magnification parameters are supplied to the graphics engine by one or more magnification applications. In an embodiment of the invention, the graphics engine performs compositing of magnified and unmagnified content for display. In an alternative embodiment, the graphics engine outputs corresponding scaled image material to the appropriate magnification application for rendering. In a further embodiment, the graphics engine may operate in both modes. The magnified output according to various embodiments of the invention enhances the accessibility of the computer system for visually handicapped or impaired users by providing high quality magnification and increased system and application stability.

20 Claims, 10 Drawing Sheets

(56) References Cited

U.S. PATENT DOCUMENTS

| | | |
|---|---|---|
| 6,784,893 B2 | 8/2004 | Marino |
| 6,788,309 B1 | 9/2004 | Swan et al. |
| 6,803,931 B1 * | 10/2004 | Roman et al. ............ 715/800 |
| 6,825,857 B2 | 11/2004 | Harasimiuk |
| 6,954,219 B2 | 10/2005 | Hermanson |
| 7,194,697 B2 | 3/2007 | Sinclair, II et al. |
| 7,197,718 B1 | 3/2007 | Westerman et al. |
| 7,800,636 B2 | 9/2010 | Sinclair, II et al. |
| 8,217,965 B2 | 7/2012 | Sinclair, II et al. |
| 2002/0063723 A1 | 5/2002 | Hirono |
| 2002/0075289 A1 | 6/2002 | Hatori et al. |
| 2002/0080152 A1 | 6/2002 | Sudo et al. |
| 2003/0016248 A1 | 1/2003 | Hayes Ubillos |
| 2003/0025715 A1 | 2/2003 | Graham et al. |
| 2003/0132948 A1 | 7/2003 | Bhogal et al. |
| 2003/0164832 A1 | 9/2003 | Alcorn |
| 2003/0164861 A1 | 9/2003 | Barbanson et al. |
| 2004/0056899 A1 | 3/2004 | Sinclair, II et al. |
| 2007/0159499 A1 | 7/2007 | Sinclair, II et al. |
| 2010/0315437 A1 | 12/2010 | Sinclair, II et al. |

OTHER PUBLICATIONS

"Low and Lower Vision Alternatives" Views and Overviews, retrieved from http://www.geocities.com/HotSprings/Villa/6113/screen_m.htm. on Jun. 16, 2004 (3 pages).

"Low and Lower Vision Alternatives", Featured Screen Magnifiers, retrieved from http://www.geocities.com/HotSprings/Villa/6113/featmags.htm, on Jun. 16, 2004 (6 pages).

* cited by examiner

MAGNIFICATION ENGINE

RELATED APPLICATIONS

This application is a Continuation of co-pending U.S. application Ser. No. 12/861,062 entitled "Magnification Engine" filed Aug. 23, 2010, which is a Continuation of U.S. application Ser. No. 11/724,123 entitled "Magnification Engine" filed Mar. 14, 2007, which issued on Sep. 21, 2010 as U.S. Pat. No. 7,800,636, which is a Divisional of U.S. application Ser. No. 10/253,680 entitled "Magnification Engine" filed Sep. 24, 2002, which issued on Mar. 20, 2007 as U.S. Pat. No. 7,194,697 B2, which are incorporated herein by reference.

TECHNICAL FIELD

This invention relates generally to the technology of computer graphics output generation and, more particularly, relates to a system and method for graphics magnification.

BACKGROUND

Computers, once thought to be the lone province of hobbyists and governments, have become an integral part of many people's lives. With the advent of friendly user interfaces, ample memory, high-speed processors, and network technologies, many everyday tasks can be accomplished much more easily via a computer. Indeed, for some tasks a computer is mandatory. Despite the increasing prevalence of computer use, the user interface aspects of many computer systems are not well suited to certain classes of users. For example, visually impaired users may have great difficulty seeing a computer screen. Even for users that can use a keyboard by touch alone, the inability to see the computer screen can preclude most computer-oriented activities such as network "surfing," document formatting, graphics work, and so on.

In the past, a number of schemes have been devised to accommodate visually impaired computer users and hence to increase the accessibility of computers in general. These schemes utilize one of an assortment of techniques to magnify the material presented on the screen, either as a whole, or for a specific application. In general, it has been undesirable for application designers to incorporate significant magnification capability into the applications themselves since this imposes a separate overhead on each application and increases the complexity of the user experience. Rather, the techniques used to date have focused on intercepting downstream display data and transforming it prior to display. Two such techniques can be generally referred to as screen reading and GDI (or DDI) hooking.

In the screen reading method, a magnification application reads the relevant portion of the material rendered on the screen. Next, the magnification application magnifies the material and overlays it on the screen. There are several problems with this approach. First, since the magnification application accesses only the final screen output, there is insufficient information to perform the magnification precisely. Instead, various forms of pixel-based magnification, such as stretch blt-ing, are performed. These techniques often result in a visible lack of clarity and a generally low level of image quality in the magnified image. In addition, since this technique requires that one portion of the screen be read to produce another (the magnification window), the magnified content cannot obscure the associated unmagnified material. This precludes full screen magnification on a single screen using this technique.

The hooking techniques (GDI or DDI hooking) generally involve splicing the magnification application into the display path so that calls between display path entities, such as a graphics device interface and a driver, are intercepted and processed (such as by magnification) prior to being passed along to the intended recipient entity to be rendered or otherwise output. The hooking techniques are subject to great instability and frequent incompatibility, and provide compromised quality even when functioning as intended. The inability of these techniques to consistently provide high quality magnification stems from the fact that the information used by the magnification application is generally too refined. For example, if an application issues a command to the GDI to draw a vector shape, the image information will generally appear in raster form after processing by the GDI. Due to this loss of information within the GDI component, magnification of the GDI output will generally not have optimum quality.

SUMMARY

A novel system and method are described for magnifying visual output information for printing, display, or other output. Generally, a graphics engine located in the display path receives display information from an application or other visual component originator, transforms the received display information so as to modify the final output image, and passes the transformed display information to a driver or other entity for rendering or display via output hardware such as a screen or printer. The graphics engine performs the modification in a manner directed by magnification parameters received from one or more magnification applications via a magnification application interface. The graphics engine also performs compositing in an embodiment of the invention so that magnified and unmagnified content can be properly displayed together in the image output. In this manner, magnification applications can direct and affect the display path but do not have unlimited access to the information in the display path. Thus the security of proprietary information in the display path may be increased. In addition, the common interface supplied to magnification applications allows magnification application manufacturers to more easily and stably effect magnification operations.

In an alternative embodiment, the magnification application interface not only receives scaling parameters from one or more magnification applications, but also outputs corresponding scaled image material to the appropriate magnification application for rendering. This embodiment decreases content security and also makes the display path more susceptible to malicious tampering. However, it also increases magnification application flexibility, and still does not require that the magnification application perform its own scaling operations.

The magnified output according to various embodiments of the invention can enhance the accessibility of the computer system for visually handicapped or impaired users. The output format is determined by a compositor of the graphics engine, either by default or according to user input. Such user input may be received by the magnification application from the user, and may then be passed to the graphics engine via a magnification application interface. In an embodiment of the invention wherein the magnification application receives the scaled material and performs rendering, the output format information may be retained by the magnification application. Potential output formats include, but are not limited to, full-screen magnification, split-screen bifocal magnification, multi-screen bifocal magnification, magnifying glass mouse, and floating window magnification.

Other features and advantages of various embodiments of the invention will become apparent from the detailed description set forth hereinafter.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Figure 1:
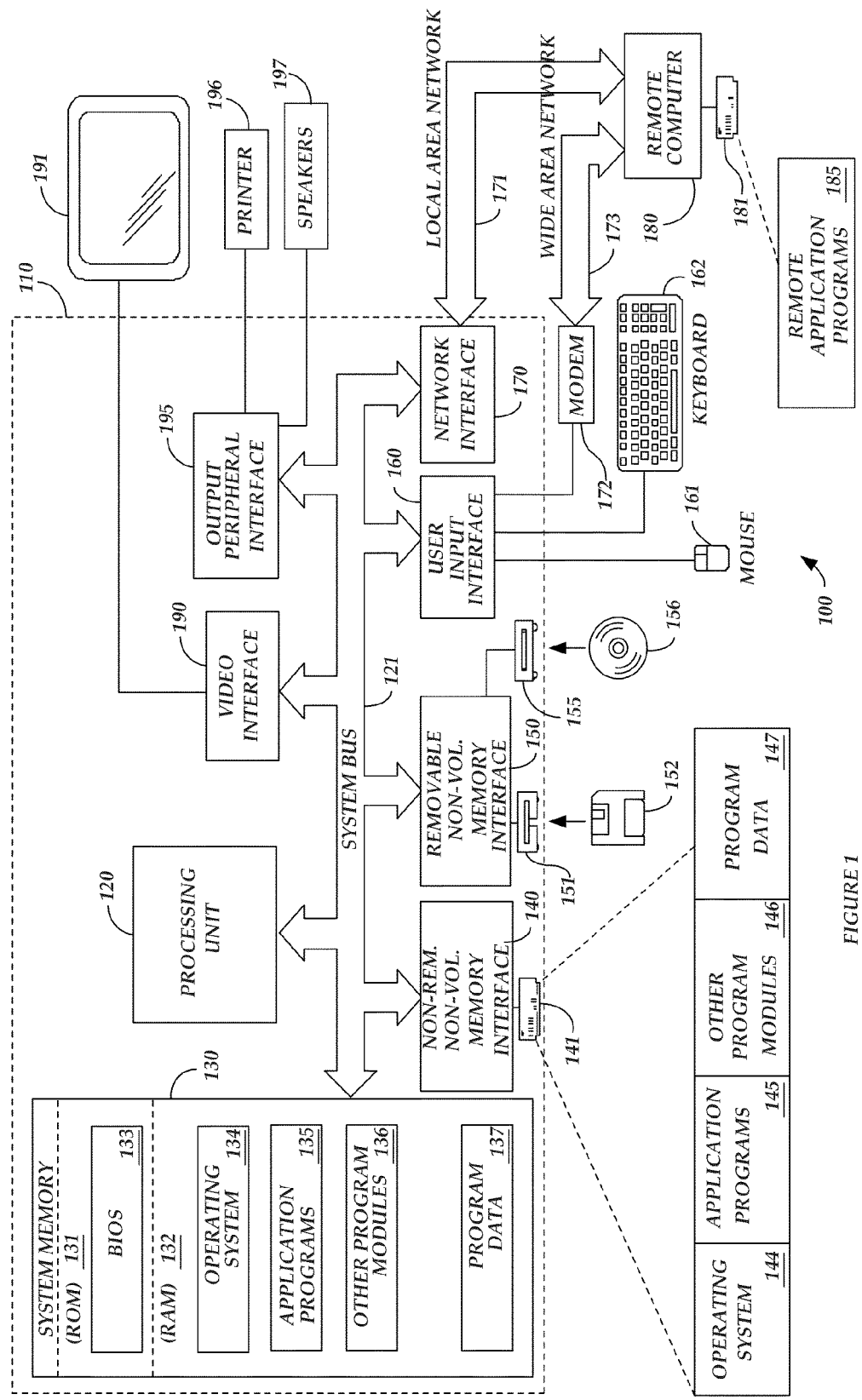
FIG. 1 is a block diagram generally illustrating an exemplary computer system usable in an implementation of an embodiment of the invention.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may be used in a networked environment and may further be practiced in distributed computing environments wherein tasks are performed by remote processing devices that are linked through a communications network. In a distributed computing environment, program modules may be located in one or both of local and remote memory storage devices.

FIG. 1 illustrates an example of a suitable computing system environment 100 usable in an implementation of the invention. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be implemented by way of numerous other general purpose or special purpose computing system environments or configurations. Examples of well known computing systems, environments, and/or configurations that are suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

An exemplary system for implementing the invention includes a general-purpose computing device in the form of a computer 110. Components of the computer 110 generally include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example only, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics (such as, for example, voltage or current level, voltage or current pulse existence or nonexistence, voltage or current pulse width, voltage or current pulse spacing, etc.) set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates RAM 132 as containing operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from and/or writes to a removable, nonvolatile optical disk 156 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162, pointing device 161 (commonly referred to as a mouse), and trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A dedicated monitor 191 or other type of display device is preferably also connected to the system bus 121 via an interface, such as a video interface 190. In addition to the monitor, computer 110 may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a router, a network PC, a peer device or other common network node. The remote computer or computers typically include many or all of the elements described above relative to the personal computer 110, although only a memory storage device 181 has been illustrated in FIG. 1, and although it will be appreciated that in some cases the remote computer can lack much of the functionality contained in the computer 110. The logical connections depicted in FIG. 1 include a local area network (LAN) 171 and a wide area network (WAN) 173, but the computer 110 may additionally or alternatively use one or more other networking environments. For example, the computer 110 may reside on an ad hoc network via a communications interface such as a wireless interface. Networking environments of all types are commonplace in offices, enterprise-wide computer networks, intranets and the Internet.

The computer 110 typically includes facilities for accessing the networks to which it is attachable. For example, when used in a LAN networking environment, the personal computer 110 is connected to the LAN 171 through a network interface or adapter 170. Another node on the LAN, such as a proxy server, may be further connected to a WAN such as the Internet. Similarly, when used in a WAN networking environment, the computer 110 typically includes a modem 172 or other means for establishing communications directly or indirectly over the WAN 173, such as the Internet. The modem 172, which may be internal or external, may be connected to the system bus 121 via the user input interface 160, or other appropriate mechanism.

In a networked environment, program modules depicted relative to the personal computer 110 such as in FIGS. 2-5 may be stored wholly or partially in a remote memory storage device as discussed above. By way of example, and not limitation, FIG. 1 illustrates remote application programs 185 as residing on memory device 181. It will be appreciated that the network connections shown are exemplary and other means of establishing a communications link between the computers may be used. It is not intended to limit the invention, when used in a network environment, to use in a permanent network infrastructure, since it may also be used in transiently connected environments, such as for example a wholly or partially wireless network environment interconnected wholly or partially via optical, infrared, and/or radio frequency wireless connections.

Herein, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
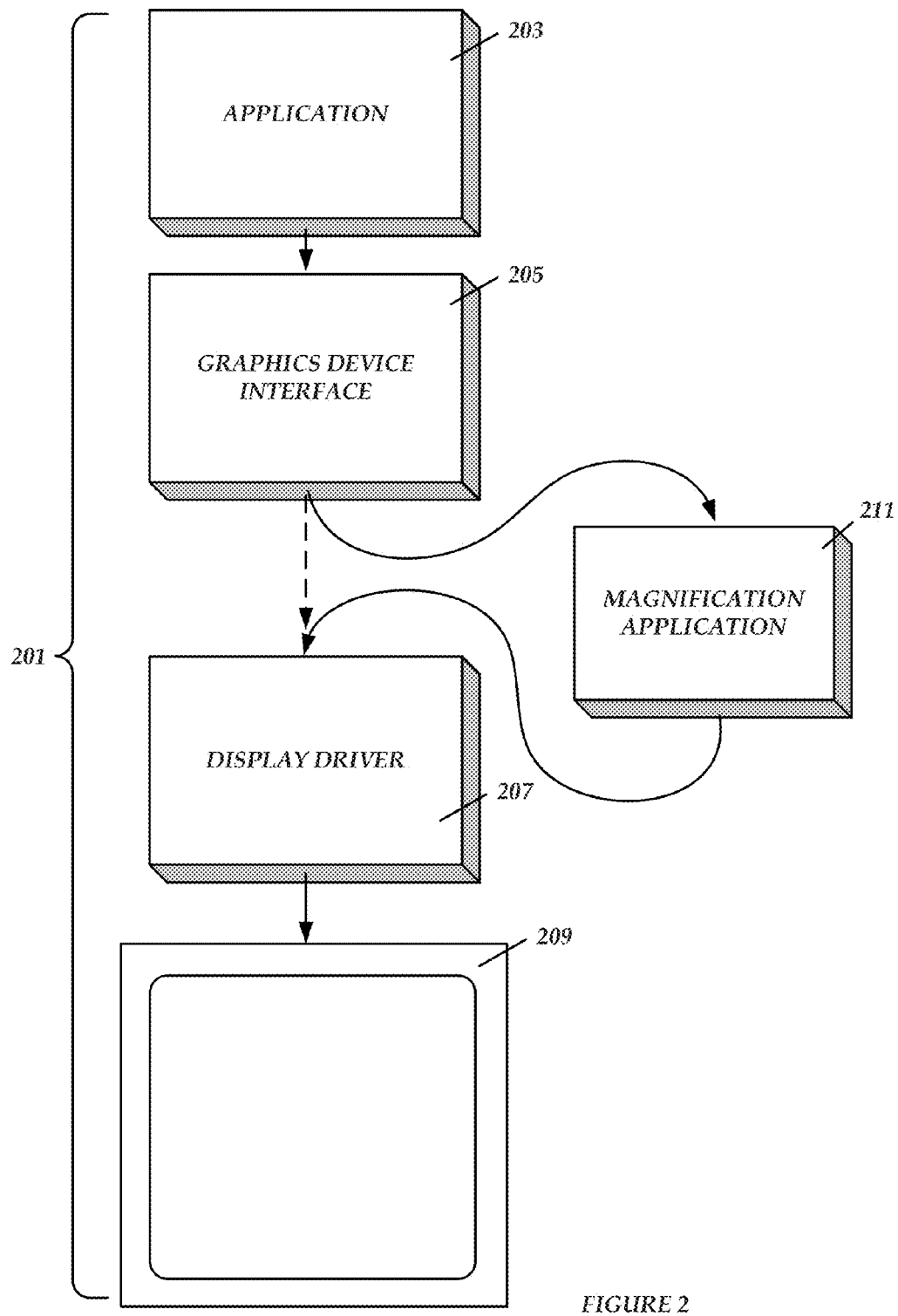
FIG. 2 is a schematic diagram showing a prior architecture for modifying an information stream in a display path to cause image component magnification.

FIG. 2 is schematic diagram showing a typical display path 201 for the rendering of graphical material in a computer environment such as those described above with reference to FIG. 1. The display path 201 includes one or more applications 203 or other high level originators of material to be displayed, a graphics device interface (GDI) 205 or other suitable intermediate entity, a suitable output device driver 207, and the screen or display 209. The application 203 is any programmatic entity that originates the material to be displayed. For example, the application 203 may be a word processing application.

The graphics device interface 205 accepts high-level calls and associated parameters from the application 203 to a GDI function for visual objects to be displayed. The graphics device interface 205 can then draw the requested object by sending appropriate commands to the output device driver 207, which would be a screen driver in the case of displayed material, or a printer driver in the case of printed material. The output device driver 207 is typically a hardware specific driver, and thus a machine associated with numerous distinct output devices may well host numerous distinct such drivers.

As discussed earlier, certain existing magnification applications 211 for screen magnification intercept calls between the GDI 205 and device driver 207 and modify portions of the intercepted information before passing it on in the display path. As discussed, this technique results in poor image quality and can also lead to system or application instability. Such magnification applications may be required to provide extensive rendering support consistent with the relevant operating system or application, and the order of loading, as between the application 203 and the magnification application 211, may impact the stability or workability of the magnification application. Moreover, when numerous such assistive technology applications use GDI hooking on the same platform, it is often difficult but critical to determine in what order to chain these applications at the intercept point. Additionally, security in the display path may increasingly prevent GDI hooking by making the display path information unavailable for intercept.

Figure 3:
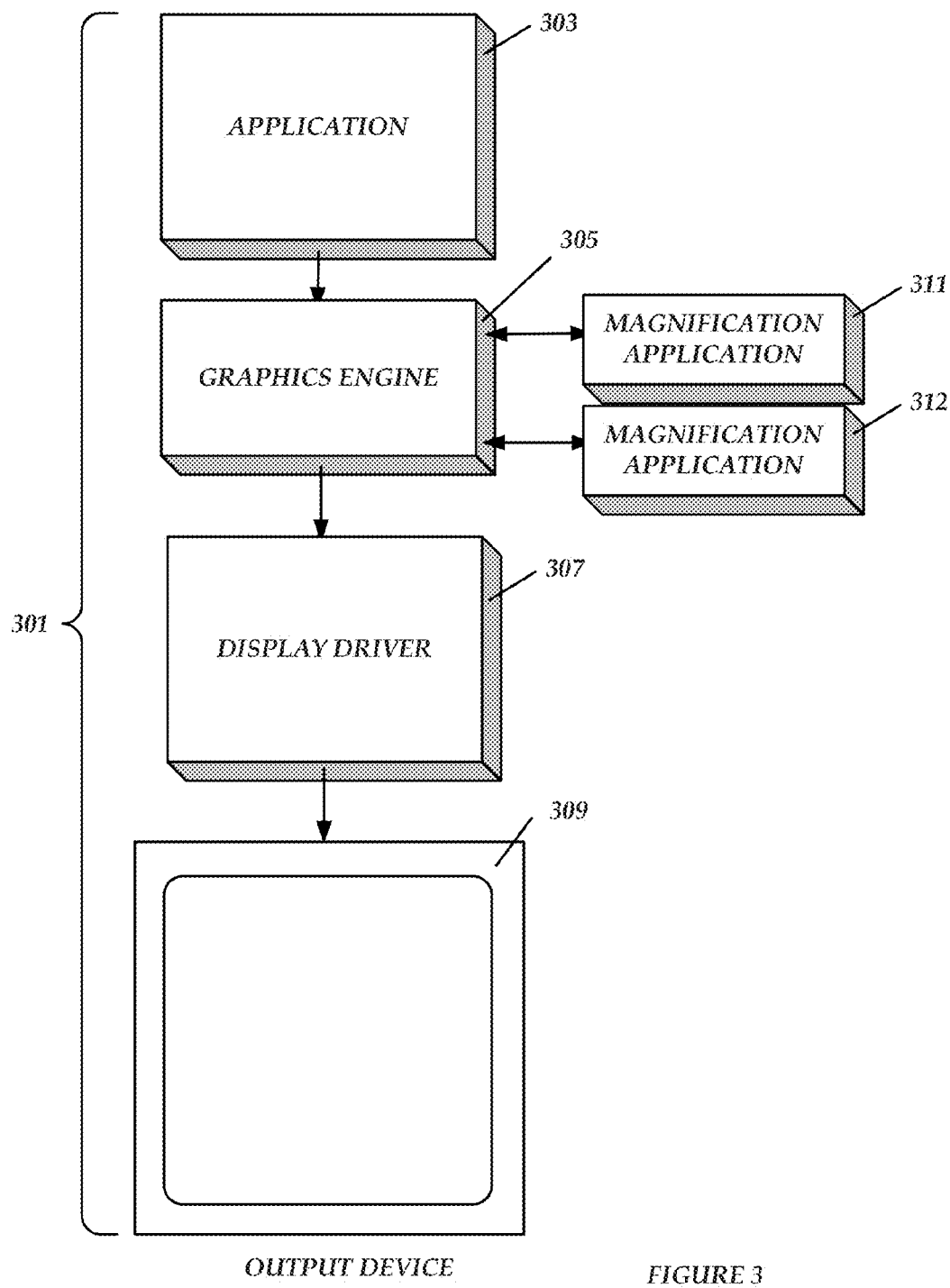
FIG. 3 is a schematic diagram showing a display path architecture according to an embodiment of the invention including a graphics engine in cooperation with one or more magnification applications for modifying an information stream in a display path to cause image component magnification.

FIG. 3 is a schematic diagram showing the display path 301 according to an embodiment of the invention. In particular, the path comprises an image originator such as application 303 and an output device 309 such as a screen. The application's graphics output is provided to a graphics engine 305 that transforms the information where appropriate, such as by magnifying all or part of the display information contained therein, and passes it to the output device 309, via driver 307 in an embodiment of the invention. The graphics engine 305 is an entity like the graphics device interface 205 of FIG. 2, but having additional functionality as described in greater detail hereinafter. One or more magnification applications 311, 312 provide input to the graphics engine 305 to specify various parameters necessary to perform the magnification function properly. The interrelated functioning of the components shown in FIG. 3 will be explained in greater detail with respect to the schematic diagram of FIG. 4.

Figure 4:
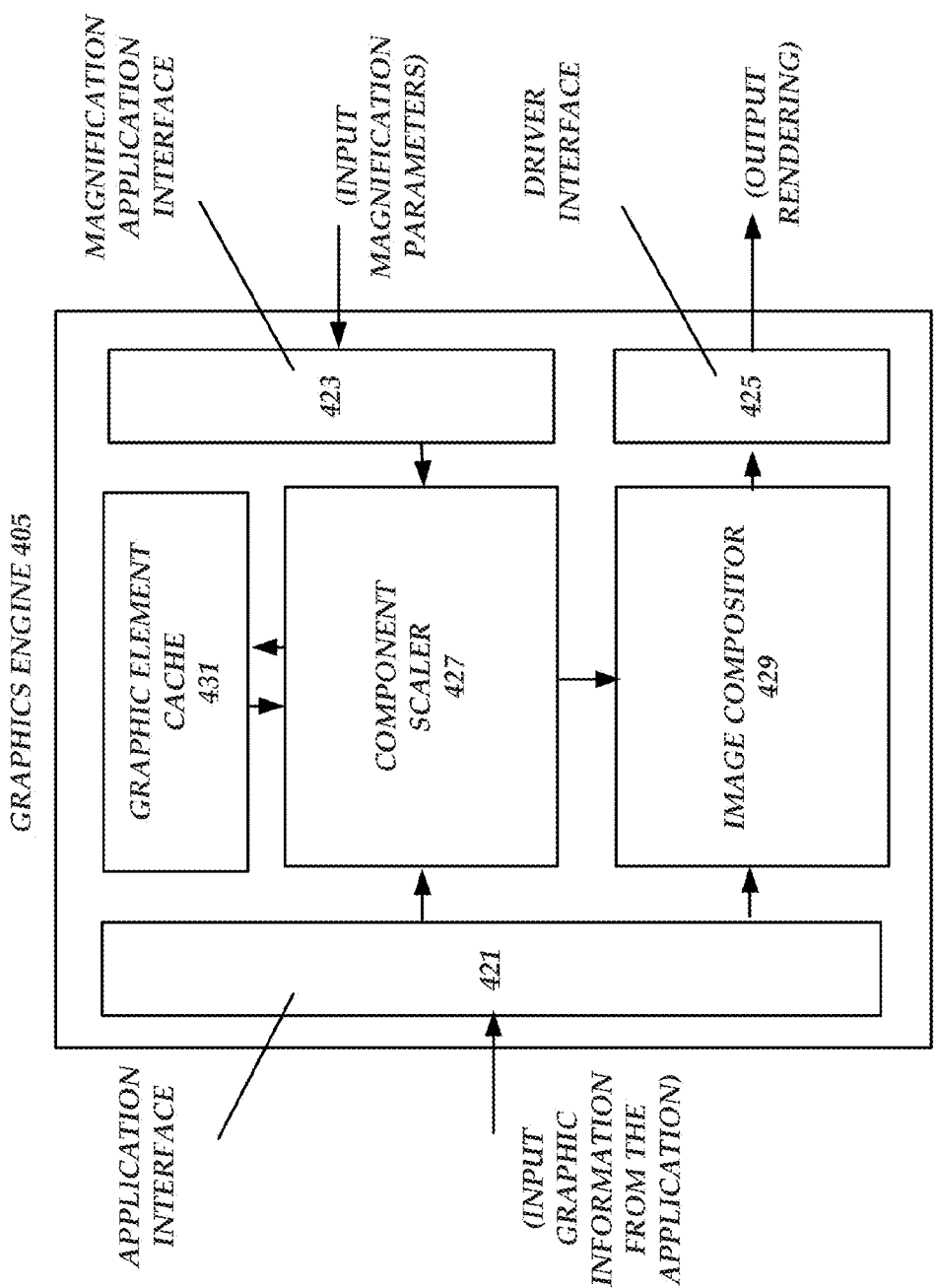
FIG. 4 is a schematic diagram showing a structure and operation of a graphics engine for performing image magnification according to an embodiment of the invention.

FIG. 4 is a schematic diagram showing the components of the graphics engine 405 according to an embodiment of the invention. The graphics engine 405 comprises, in an embodiment of the invention, an application interface 421, a magnification application interface 423, and a device driver or device driver interface 425. The primary components of the graphics engine 405 that are responsible for preparing the screen image are the component scaler 427 and the image compositor 429. In an embodiment of the invention, the component scaler 427 communicates with a graphic element cache 431, to be discussed in a later section.

The application interface 421 is responsible for receiving information from an application such as application 303 and for passing that information to the component scaler 427 and the image compositor 429. The magnification application interface 423 receives input from one or more magnification applications such as magnification applications 311 and/or 312 of FIG. 3. The received input comprises for each magnification application in an embodiment of the invention a source identification specifying the source area to be magnified, a target identification specifying the target area to which the magnified output is to be rendered, and a scale factor. It will be appreciated that a number of other parameters may be specified by the magnification application(s) at the discretion of the designer thereof. The source identification may be an identification of a particular pixel area or may be an identification of a graphical entity such as a particular window or object. The target identification is preferably given in terms of target pixels. Finally, the scale factor identifies the degree to which the source area should be magnified. This value is typically derived from user input to the magnification application, although it may also be fixed, or may be variable in an automated fashion. Note that in many cases, some portion of the material from the source area will not appear in the target area since the scaling operation may push some of the material beyond the bounds of the target area. For example, if the target area and the source area are the same size and the requested magnification is 2x, then half of the material originally within the source area will not appear in the target area in the rendered output.

The image compositor 429 receives the output of the component scaler 427 as well as information from the application interface 421. The image compositor 429 is responsible for composing the image to be displayed from the information received from the application interface 421 and the component scaler 427. For example, the information from the application interface 421 may indicate an application window, and the information from the component scaler 427 may indicate a magnified portion of that window. The image compositor 429 combines these components to form the appropriate display (to be discussed below), and forwards the composited image information to the display driver interface 425. The display driver interface 425 in turn formats the composited image information as appropriate for the particular display device driver or printer driver used for graphical output and supplies the formatted information to the appropriate graphical output hardware device or driver.

Note that in this embodiment of the invention the magnification applications are not required to render information to the screen (via a driver) as in other techniques. Rather, each magnification application simply supplies parameters, such as those regarding source, target, and scale, to the graphics engine 405 and the magnification and rendering are then accomplished independently of the magnification application. This embodiment may provide certain benefits relative to an embodiment, to be discussed below, in which the magnification application is itself responsible for rendering. For example, when the graphics engine 405 performs both the scaling and rendering functions, it is simpler to optimize screen update performance. That is, it is easier to assure that the magnified area is updated promptly when needed, and only when needed. In addition, this embodiment can be used to assure that third parties do not have access to the screen contents through the display path. This serves to provide added security for content providers since their protected content is no longer accessible from the display path.

Figure 5:
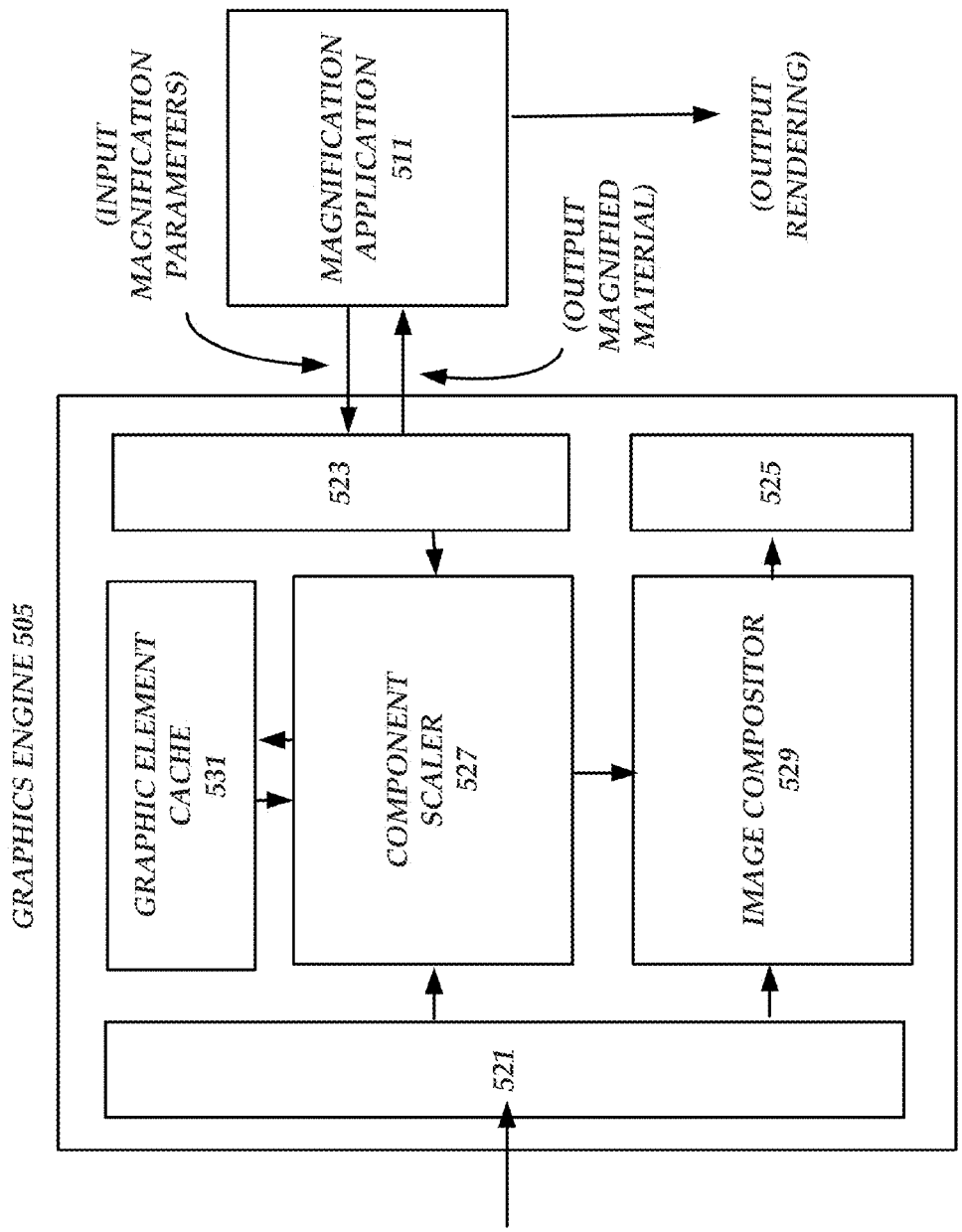
FIG. 5 is a schematic diagram showing an alternative structure and operation of a graphics engine for performing image magnification according to an alternative embodiment of the invention.

A graphics engine 505 according to an alternative embodiment is illustrated schematically in FIG. 5. In the illustrated embodiment, the component scaler 527 remains responsible for the scaling of the source area material. However, the scaled content is then passed back out of the graphics engine 505 by way of the magnification application interface 523 to the magnification application 511. It is the magnification application 511 that is responsible for rendering the scaled material such as by communicating with a device driver or device driver interface.

Note that in this embodiment the compositor 529 and device driver interface 525 may be omitted if desired. However, the embodiments of FIGS. 4 and 5 are not mutually exclusive, and both types of functionality may be implemented by the graphics engine 505. That is, the graphics engine 505 may output scaled material to one or more magnification applications for rendering, while still outputting the scaled material for one or more other magnification applications to the image compositor 529 for rendering. Note that regardless of the embodiment employed, the transfer of image data and other information may be direct or may be accomplished by passing a pointer to a specific memory region on the platform, such as memory 132 of platform 110.

When scaling the source area material, care should generally be taken to assure that the best quality scaled output is provided. Certain types of materials provide special challenges in this regard. For example, fonts may be difficult and time-consuming to scale, and once they are scaled, pixel correspondence in the resultant image preferably needs to be assured so that text remains readable. In an embodiment of the invention, a graphics element cache 431, 531 is provided to store graphical objects such as fonts that have been scaled. The cache 431, 531 may hold a selection of prescaled fonts or other prescaled graphical objects in anticipation of magnification and hence scaling. For example, if the text of interest in an image is composed in Font "X," the cache 431, 531 may be pre-populated by scaled versions of the relevant characters in that font at selected scales such as 2×, 4×, and 8×. Alternatively, the cache 431, 531 may be populated by scaled fonts and other objects as they are produced during scaling. In this manner, as the focus of the magnification shifts and returns, scaling need not be repeated.

Since the cache 431, 531 will have a finite size, it will often be desirable to choose not to cache certain objects. For example, greatly magnified text may consume most of the cache 431, 531 such that the cache is continually being overwritten as the focus of the magnification shifts. In such cases, it is preferable to limit the size of objects that will be stored in the cache 431, 531, and thus not cache objects of a size greater than a predetermined limit. The limit may be expressed as a fraction of the cache size or as a numerical limit. Although relevant embodiments of the invention are not limited to any particular cache limit, one exemplary limit is one half of the cache capacity.

With regard to pixel correspondence in the final magnified image, the image compositor 429, 529 preferably maintains the relationships between various graphical objects during compositing. For example, a text string that is magnified 25% should appear in the final image as a string that is simply 25% larger in length and height, with the spacing of the characters remaining the same relative to the size of the characters.

Figure 6A:
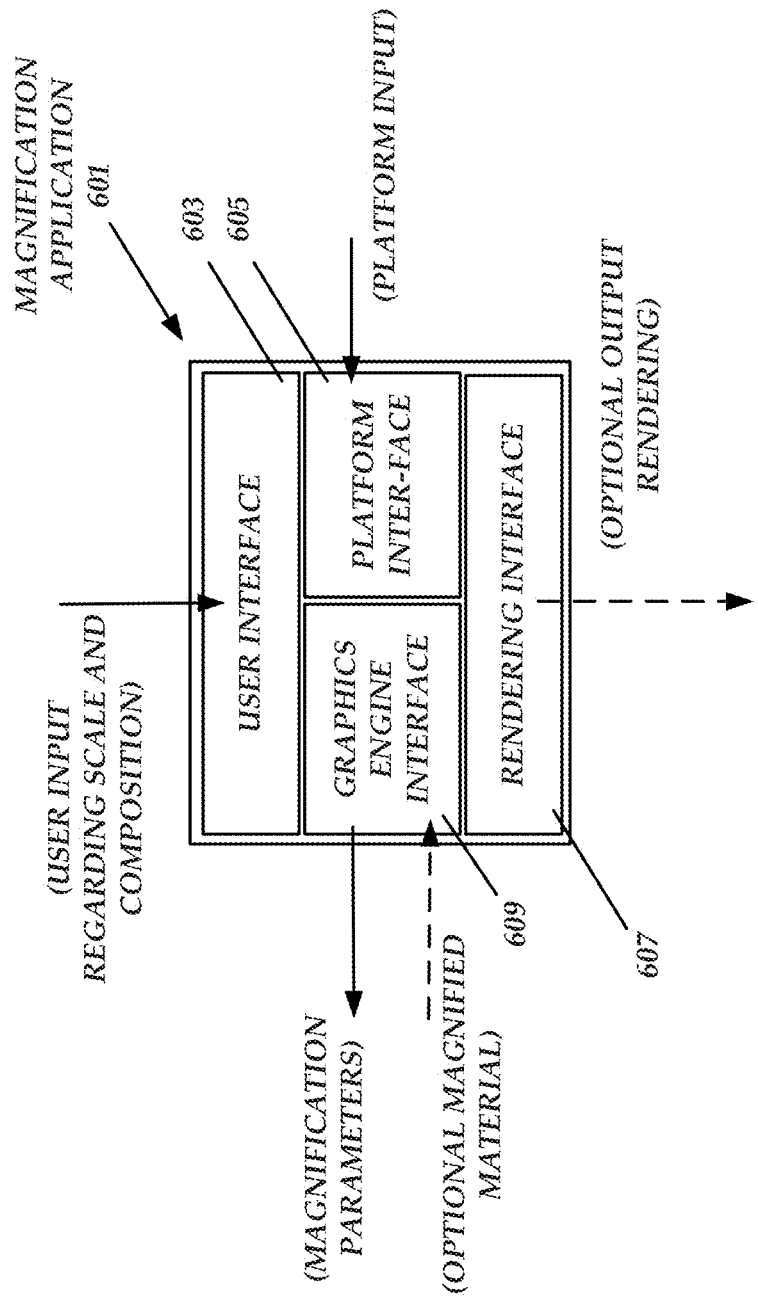
FIG. 6A is a schematic diagram showing the structure and operation of a magnification application according to an embodiment of the invention.

FIG. 6A is a schematic diagram of a magnification application 601 according to an embodiment of the invention. The magnification application 601 corresponds to the magnification applications 311 and/or 312 and is preferably usable in conjunction with the graphics engine 305, 405, 505. In overview, the magnification application 601 utilizes an external magnification facility to provide high quality magnified content, and, in certain embodiments, to render the final image.

In greater detail, the magnification application 601 comprises a user interface 603, a platform interface 605, a rendering interface 607, and a graphics engine interface 609. The user interface 603 presents an interface, such as a visible interface rendered on a screen, to a user of the application 601, so that the user may select magnification constraints such as scale and type of resulting display (see below for a number of potential display types). For example, one display type would be a split-screen bifocal display. The user interface 603 collects the user input regarding magnification constraints.

The platform interface 605 collects information from the host platform that is relevant to the magnification and display process. For example, cursor movement may alter the magnification focus or source. Also, selection and manipulation of windows and objects, such as to move or resize a window etc. may alter the magnification target. Manipulation of a scroll wheel or selection of a scroll icon may also change the magnification target. In addition, a change in the material to be magnified, such as by operation of the application generating the material, may cause an update to the display of the magnified material. In general, all such relevant platform information is collected via the platform interface 605 so that it may be used when necessary to alter the magnification source, target, scale, and so on.

In order to utilize the external magnification facility, the magnification application 601 provides magnification parameters to the external magnification facility via a graphics engine interface 609. The supplied magnification parameters may include for example an identification of the magnification source, target, and scale, and may also include composition information (such as a request to compose the output as a split-screen bifocal display for example) in an embodiment of the invention wherein the external facility includes a compositor.

In an embodiment of the invention, the graphics engine interface 609 is optionally operable to receive magnified content from the external facility according to the magnification parameters. In this embodiment, the magnification application 601 also preferably comprises a rendering interface 607 to interface the magnification application 601 to output hardware, such as via a hardware driver. Alternatively, the magnification application 601 may itself comprise one or more such drivers. In this embodiment, the magnification application 601 preferably composites its output such as by specifying a target location on the screen or other output device, a z-order, etc.

Figure 6B:
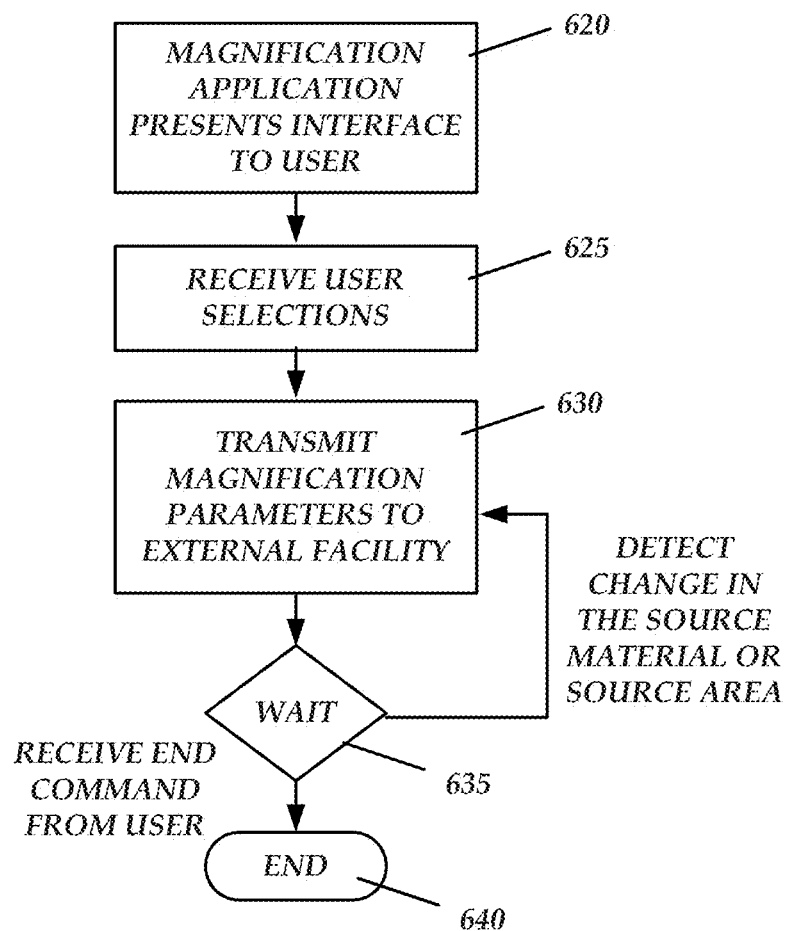
FIG. 6B is a flow chart illustrating the operation of a magnification application according to an embodiment of the invention.

The operation of the magnification application 601 is illustrated in flow chart form in FIG. 6B for an embodiment of the invention. In particular, FIG. 6B illustrates the operation of the magnification application 601 when the external graphics facility is used for both magnification and rendering. At step 620, the magnification application 601 presents an interface to a user via the user interface 603. Upon selection of the various magnification constraints by the user, such selections are received by the magnification application 601 at interface 603 in step 625. Subsequently at step 630, the magnification application 601 transmits magnification parameters as discussed above via the graphics engine interface 609 to the external graphics facility.

Since the external graphics facility is responsible in this embodiment of the invention for compositing and rendering the magnified content, the magnification application 601 waits at step 635 for either a change in the source material or source area itself or for an end command from the user. Changes in the source material or source area may be determined via information received from the platform at the platform interface 605 as discussed above. If such information is received, then the magnification application 601 recalculates and resends the magnification parameters via the graphics engine interface 609 to the external graphics facility at step 630, and resumes waiting at step 635. If instead an end command is received from the user via user interface 603, then the application 601 terminates at step 640.

The final composition of the original screen material and the magnified material can take one or more of a number of different forms. Exemplary configurations include full-screen magnification, split-screen bifocal magnification, multi-screen bifocal magnification, magnifying glass mouse, and floating window magnification. These various configurations will be explained briefly with reference to FIG. 7A-D.

Figure 7A:
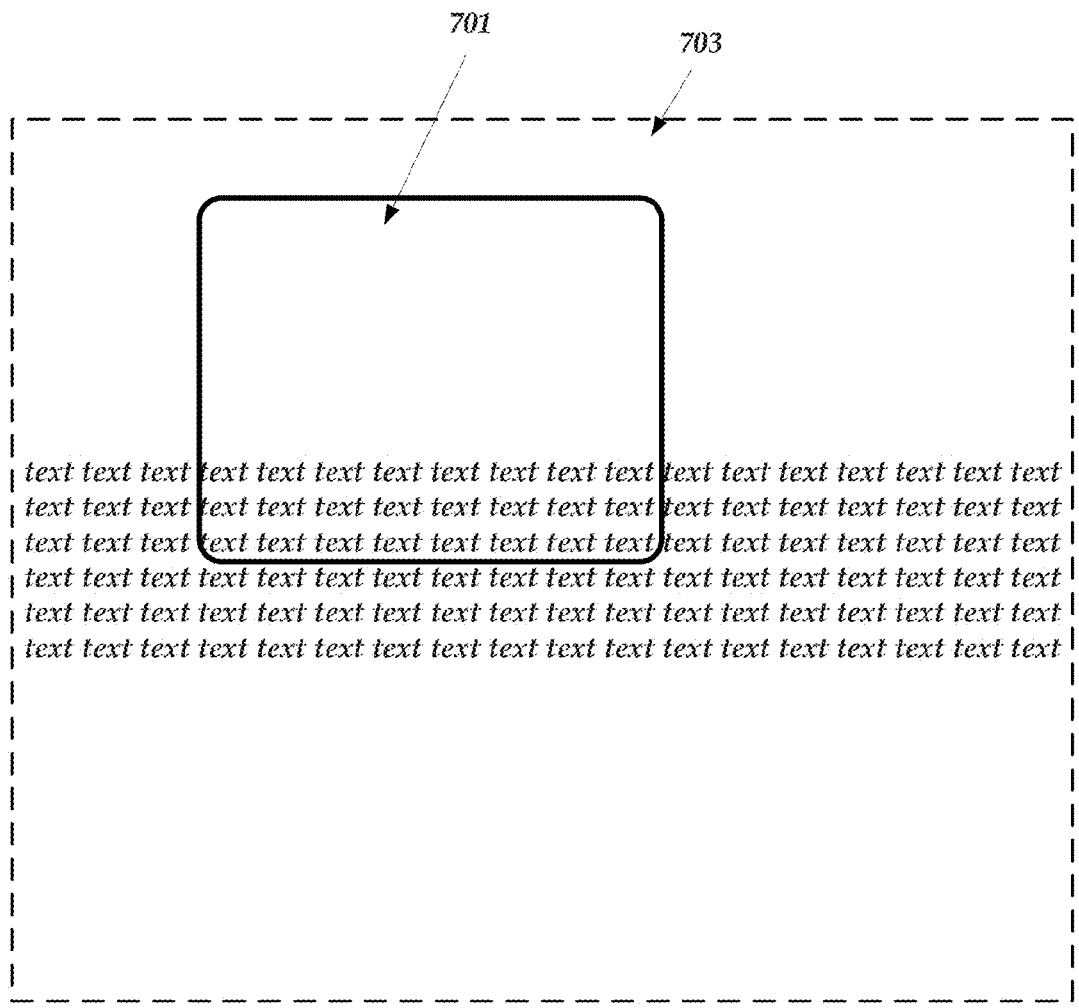
FIGS. 7A-7D are simulated screen views corresponding to various output formats for magnified content as composited by the graphics engine according to various embodiments of the invention.

A full-screen magnification configuration usable in an embodiment of the invention is shown in FIG. 7A. In this configuration, the full viewable screen area 701 acts as a view port onto a virtual desktop 703 corresponding to a magnified version of the full-size desktop that would have been displayed without magnification. The focus of the magnification operation can preferably be changed by the user such as by scrolling, pointing, etc. The portions of the virtual desktop 703 that are not presently visible on the screen 701 may be stored in memory. Alternatively, as discussed above, such off screen portions may be generated as they are needed, i.e. as the focus of the magnification is changed. In addition, portions that have been generated in this manner may be stored for future use should the focus return to that portion and the portion not have been changed in the interim. It is not required that any portion of the virtual desktop 703 be processed and/or stored other than the currently visible portion on the screen 701.

Figure 7B:
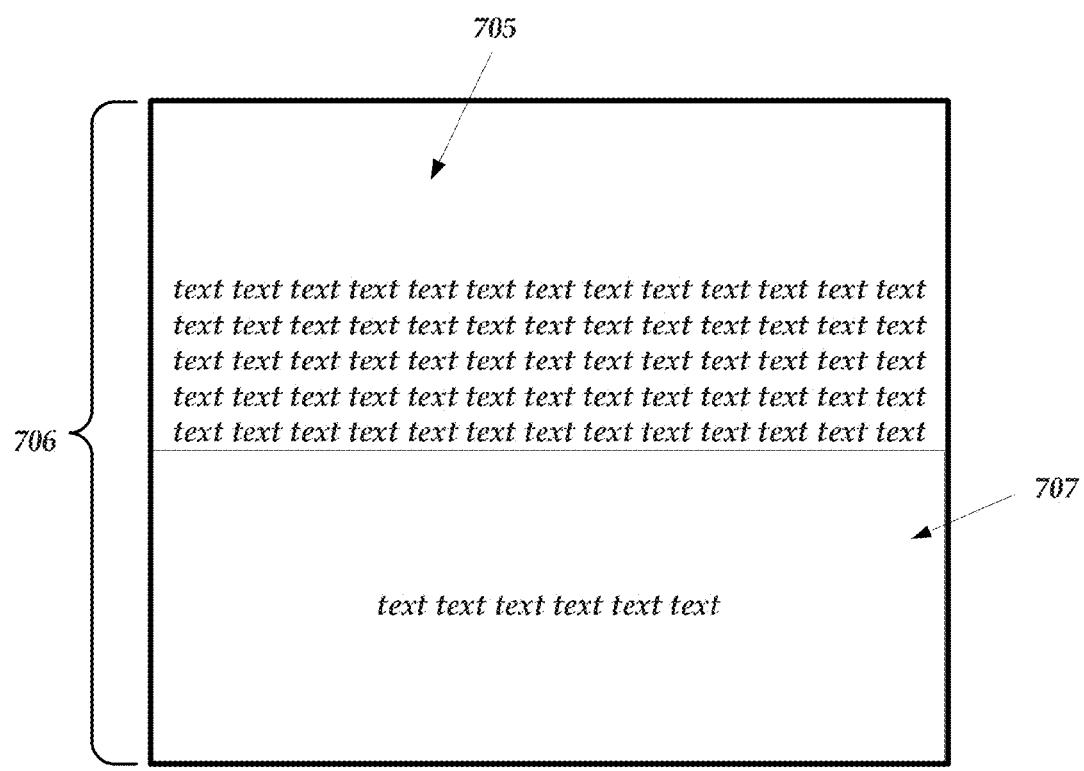

FIG. 7B illustrates a split-screen bifocal magnification configuration usable in an embodiment of the invention. In this configuration, the screen 706 is split into two portions, a magnification area 707 and an unmagnified area 705. The unmagnified area 705 corresponds to at least a portion of the output display without any magnification applied. The magnification area 707 corresponds to a magnified version of some portion of the unmagnified desktop. Note that the portion of the desktop that is magnified may be in the unmagnified area 705 or may be hidden beneath the magnification area 707. Again, the focus of the magnification operation can preferably be changed by the user such as by scrolling, pointing, etc. As with the previously described configuration, scaled content may or may not be stored.

Figure 7C:
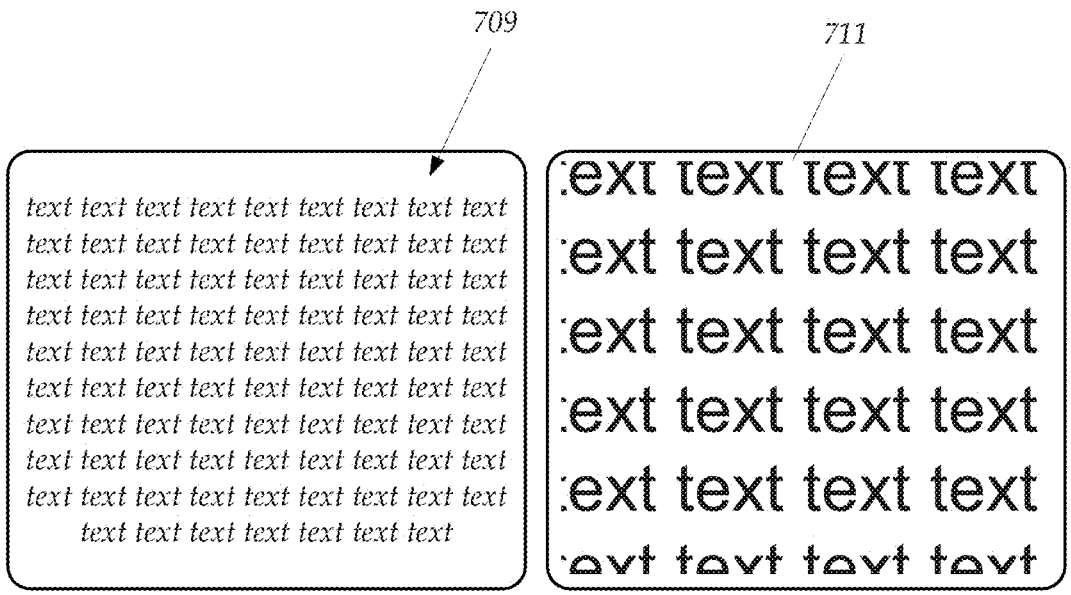

A multi-screen bifocal magnification configuration usable in an embodiment of the invention is shown in FIG. 7C. In this configuration, two separate monitors or screens are employed by the user. The screen 709 of the first monitor displays the unmagnified content of the desktop. The screen 711 of the second monitor displays a magnified version of a portion of the unmagnified desktop. In this configuration, unlike other configurations, the entirety of the unmagnified desktop can be seen, unobscured by a magnification window or area. As discussed above, the focus of the magnification operation is preferably user-selectable, and magnified versions of portions of the desktop may or may not be stored when not in use, and may or may not be pre-generated prior to use.

Figure 7D:
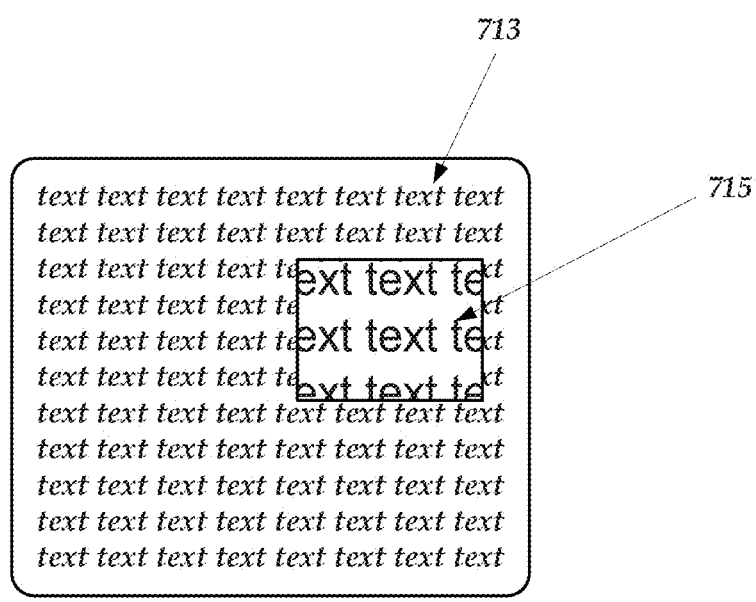

FIG. 7D illustrates a magnifying glass mouse magnification configuration usable in an embodiment of the invention. In this configuration, the cursor acts to position a virtual magnifying glass, such that a magnified version 715 of the screen content adjacent the cursor will displayed above the unmagnified desktop 713. The cursor position is preferably under user control, such as via a mouse or other pointing device as discussed above. Also as discussed, magnified portions of the desktop may or may not be stored when not displayed, and may or may not be pre-generated prior to use.

A configuration similar to the magnifying glass mouse configuration is the floating window magnification configuration. In this configuration, the magnified desktop portion is represented in a floating window that may be moved about the desktop, but that does not necessarily move in conjunction with cursor movements or obscure the corresponding unmagnified portion as in the previously discussed configuration. In an alternative configuration, the floating window is instead docked or dockable.

It will be appreciated that a new method and system for computer display magnification have been disclosed herein. In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Additionally, although the figures illustrate the scaling of text for convenience, it will be appreciated, as discussed above, that any type of graphical material may be used within embodiments of the invention. Furthermore, although user interface aspects have been disclosed above, there is no requirement that such aspects be present in each embodiment of the invention, as it is also contemplated to set magnification constraints and/or activate the magnification application by default in an embodiment of the invention. Therefore, the invention as described herein contemplates all such embodiments as may come within the scope of the following claims and equivalents thereof.

What is claimed is:

1. A computer-readable storage medium having a set of instructions which when executed provides a method of scaling and displaying a selected portion of a graphical display via an output display device, the method executed by the set of instructions comprising:
   receiving a set of magnification parameters comprising a source identification parameter and a target identification parameter;
   determining a position of a cursor;
   associating the source identification parameter with the position of the cursor;
   associating the target identification parameter with a portion of the output display surrounding the position of the cursor; and
   transmitting to a graphics engine in a display path of the output display device information corresponding to the magnification parameters.

2. The computer-readable storage medium of claim 1, wherein transmitting to the graphics engine comprises transmitting to the graphics engine comprising:
   a component scaler for scaling a source area specified by the source identification parameter to create the scaled portion in accordance with the magnification parameters.

3. The computer-readable storage medium of claim 2, wherein transmitting to the graphics engine comprises transmitting to the graphics engine comprising:
   an image compositor for combining the graphical display and the scaled portion, wherein the graphics engine scales the selected portion of the graphical display and causes the scaled selected portion to be rendered via the output display device in a specified target area of the graphical display associated with the output display device, the specified target area being identified by the target identification parameter.

4. The computer-readable storage medium of claim 1, wherein associating the source identification parameter with the position of the cursor comprises associating the source identification parameter with at least one of the following: a particular pixel area, a particular displayed window, and a particular display object.

5. The computer-readable storage medium of claim 1, further comprising recalculating, upon detection of a change in the position of the cursor, the source identification parameter.

6. The computer-readable storage medium of claim 5, further comprising retransmitting to the graphics engine in the display path of the output display device information corresponding to the recalculated magnification parameters, wherein at least a portion of the retransmitted information corresponding to the recalculated magnification parameters is stored in a cache associated with the graphics engine.

7. The computer-readable storage medium of claim 1, further comprising recalculating, upon detection of a change in the selected portion of the graphical display, the set of magnification parameters, wherein recalculating, upon detection of the change in the selected portion of the graphical display, the set of magnification parameters comprises receiving an indication that a magnification source area in the output display device has changed in one of content and position from at least one of the following: a cursor movement altering a magnification source, a manipulation of windows and objects comprising the magnification source, and a manipulation of a scroll wheel altering a display of the magnification source.

8. The computer-readable storage medium of claim 1, wherein transmitting information corresponding to the magnification parameters comprises transmitting the magnification parameters wherein at least part of the information is received from a cache associated with the graphics engine.

9. A method of scaling and displaying a selected portion of a graphical display via an output display device, the method comprising:
receiving via a user interface of a set of magnification parameters comprising a source identification parameter and a target identification parameter;
determining a position of a cursor;
correlating the source identification parameter with the position of the cursor; and
transmitting to a graphics engine in a display path of the output display device information corresponding to the magnification parameters, wherein the graphics engine comprises:
a component scaler for scaling a source area specified by the source identification parameter to create the scaled portion in accordance with the magnification parameters, and
an image compositor for combining the graphical display and the scaled portion, wherein the graphics engine scales the selected portion of the graphical display and causes the scaled selected portion to be rendered via the output display device in a specified target area of the graphical display associated with the output display device, the specified target area being identified by the target identification parameter.

10. The method of claim 9, wherein receiving via the user interface of the set of magnification parameters comprises receiving the source identification parameter comprising at least one of the following: a particular pixel area, a particular displayed window, and a particular display object.

11. The method of claim 9, further comprising recalculating, upon detection of a change in the selected portion of the graphical display, the set of magnification parameters.

12. The method according to claim 11, wherein recalculating, upon detection of the change in the selected portion of the graphical display, the set of magnification parameters comprises receiving an indication that a magnification source area in the output display device has changed in one of content and position from at least one of the following: a cursor movement altering one of a magnification focus and a magnification source, a manipulation of windows and objects comprising the magnification source, a manipulation of a scroll wheel altering a display of the magnification source, and a change in material of the magnification source.

13. The method of claim 11, further comprising retransmitting to the graphics engine in the display path of the output display device information corresponding to the recalculated magnification parameters, wherein at least a portion of the retransmitted information corresponding to the recalculated magnification parameters is stored in a cache associated with the graphics engine.

14. The method of claim 9, wherein receiving via the user interface the set of magnification parameters comprises receiving the magnification parameters identification parameter comprising further comprise an identification of the portion of the display output, an identification of a desired target area on the output device wherein the scaled portion should appear, and an identification of a scale factor by which to scale the portion.

15. The method of claim 9, wherein transmitting information corresponding to the magnification parameters comprises transmitting the magnification parameters wherein at least part of the information is received from a cache associated with the graphics engine.

16. The method of claim 9, wherein transmitting information corresponding to the magnification parameters comprises to the graphics engine in a display path of the output display device the output display device is associated with a device selected from the group consisting of a printer and a monitor.

17. A system for scaling and displaying a selected portion of a graphical display via an output display device, the system comprising:
a memory storage; and
a processing unit coupled to the memory storage, the processing unit being configured to:
receive a set of magnification parameters comprising a source identification parameter and a target identification parameter,
determine a position of a cursor,
associate the source identification parameter with the position of the cursor,
associate the target identification parameter with a first portion of the output display surrounding the position of the cursor,
detect a relocation of the position of the cursor,
update, in response to the relocation, the association of the source identification parameter with the relocated position of the cursor,
update, in response to the relocation, the association of the target identification parameter with a second portion of the output display surrounding the relocated position of the cursor, and
transmit to a graphics engine in a display path of the output display device information corresponding to the magnification parameters, wherein the graphics engine comprises:

a component scaler for scaling a source area specified by the source identification parameter to create the scaled portion in accordance with the magnification parameters, and an image compositor for combining the graphical display and the scaled portion, wherein the graphics engine scales the selected portion of the graphical display and causes the scaled selected portion to be rendered via the output display device in a specified target area of the graphical display associated with the output display device, the specified target area being identified by the target identification parameter.

18. The system of claim 17, wherein the source identification parameter comprises at least one of the following: a particular pixel area, a particular displayed window, and a particular display object.

19. The system of claim 18, wherein the processing unit is further configured to recalculate, upon detection of a change in the selected portion of the graphical display, the set of magnification parameters.

20. The system of claim 19, wherein the processing unit being configured to recalculate, upon detection of the change in the selected portion of the graphical display, the set of magnification parameters comprises the processing unit being configured to receive an indication that a magnification source area in the output display device has changed in one of content and position from at least one of the following: a cursor movement altering one of a magnification focus and a magnification source, a manipulation of windows and objects comprising the magnification source, a manipulation of a scroll wheel altering a display of the magnification source, and a change in material of the magnification source.

* * * * *